Aug. 5, 1952 J. F. CURRIVAN 2,605,946
CARTON LOADING DEVICE
Filed April 19, 1949 4 Sheets-Sheet 1

INVENTOR
John F. Currivan
By Strauch & Hoffman
Attorneys

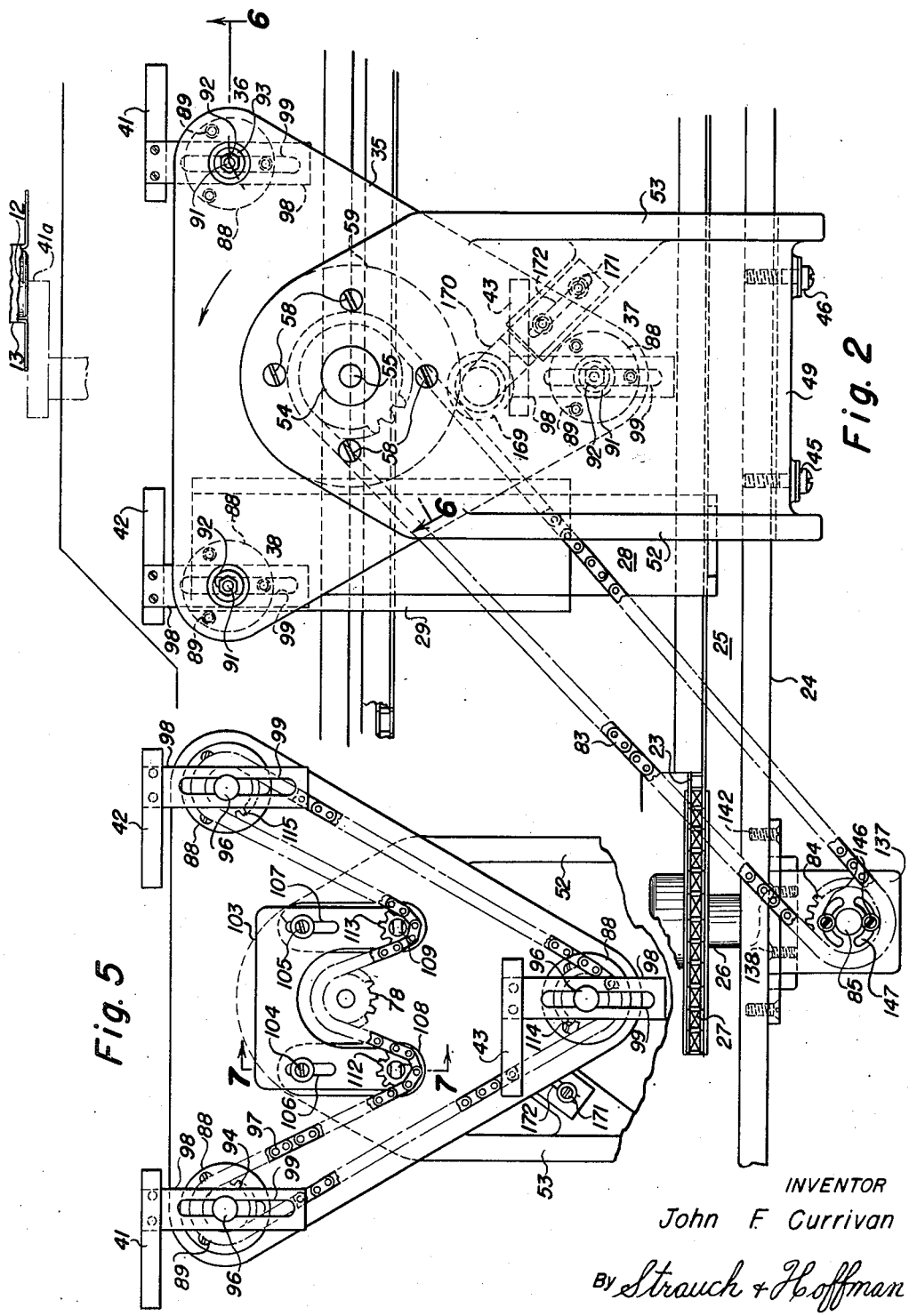

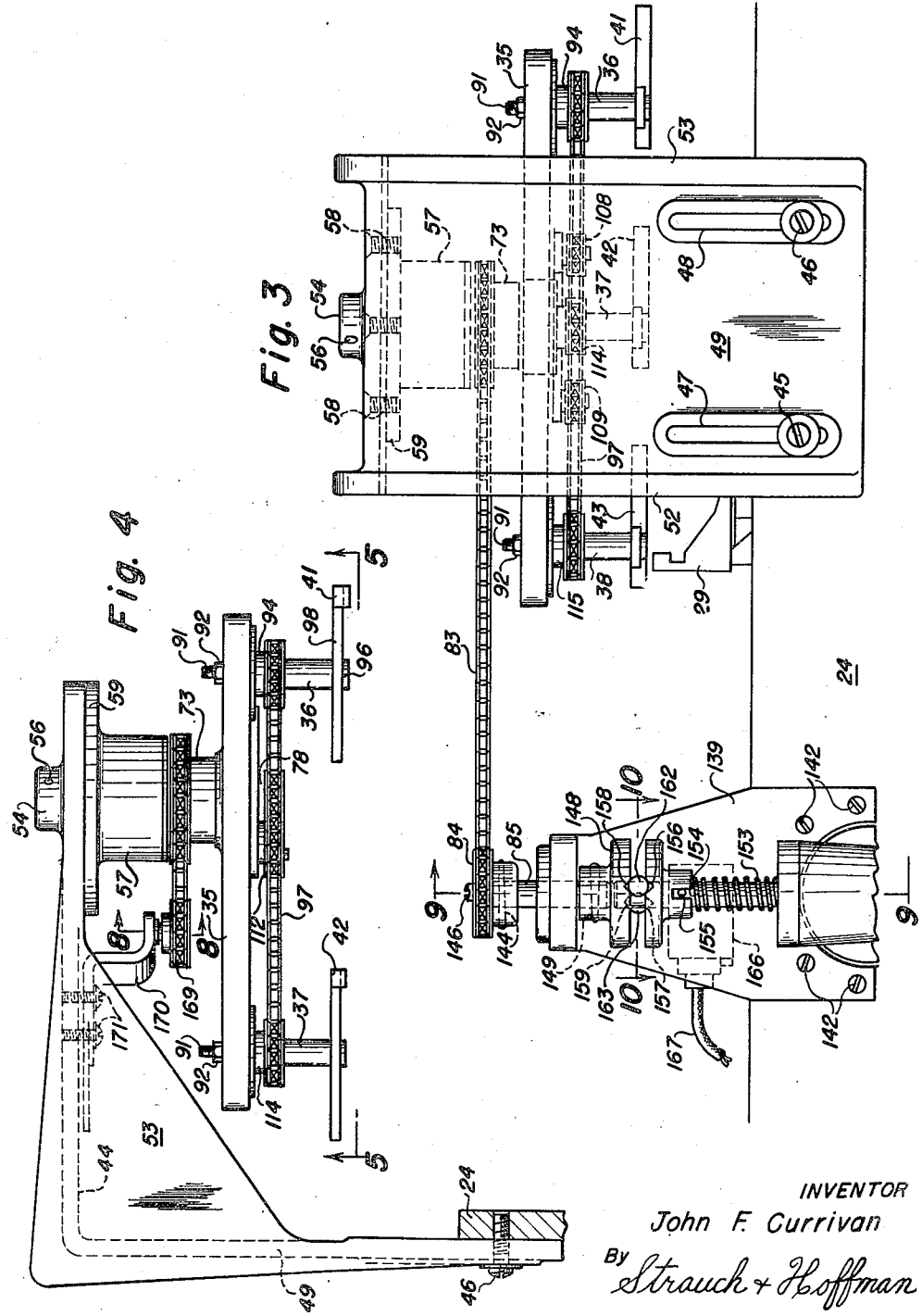

Aug. 5, 1952 J. F. CURRIVAN 2,605,946
CARTON LOADING DEVICE
Filed April 19, 1949 4 Sheets-Sheet 4
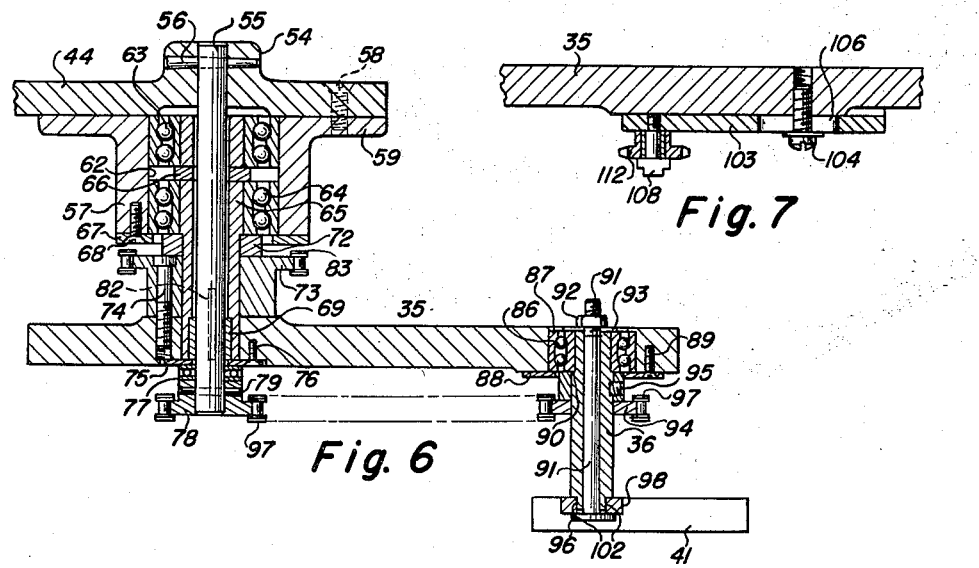
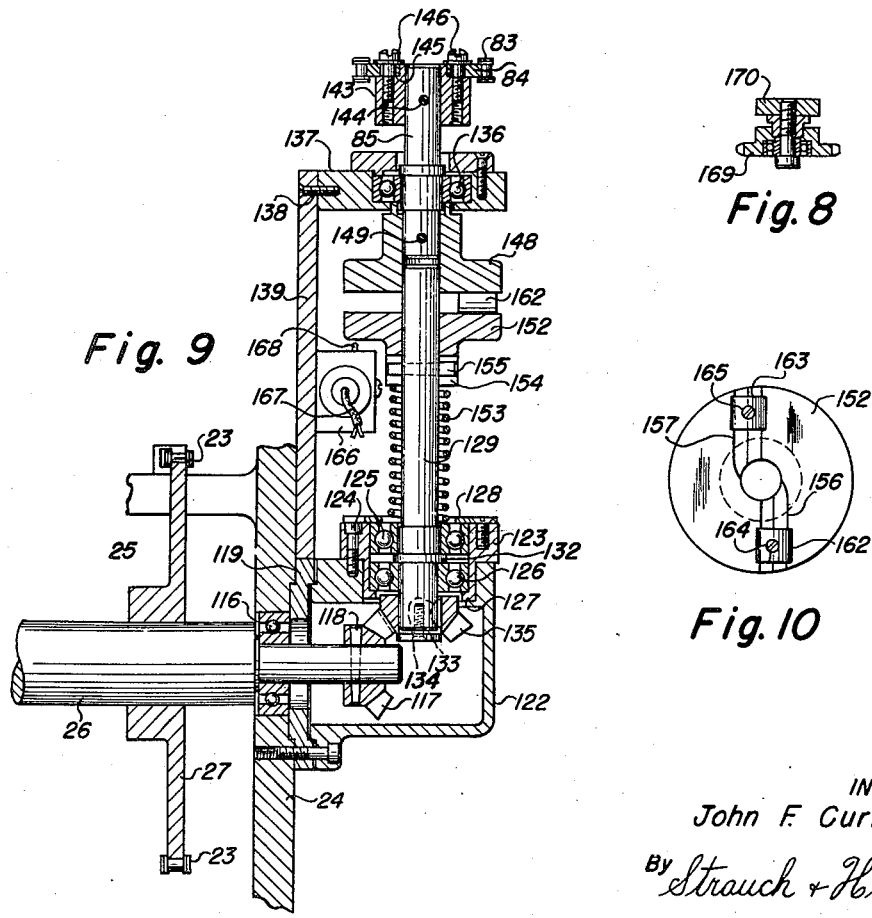
INVENTOR
John F. Currivan
By Strauch & Hoffman
Attorneys Patented Aug. 5, 1952

2,605,946

UNITED STATES PATENT OFFICE 2,605,946

CARTON LOADING DEVICE

John F. Currivan, Dayton, Ohio, assignor, by mesne assignments, to Emhart Manufacturing Company, a corporation of Delaware Application April 19, 1949, Serial No. 88,329

3 Claims. (Cl. 226—2)

This invention relates to improvements in cartoning machines, and in particular to the mechanism for transferring articles from the loading conveyor to the cartons.

Numerous types of cartoning machines comprise a first conveyor or transport which moves a series of open ended cartons along a rectilinear path paralleling a second or loading conveyor that carries articles to be inserted into the cartons. As a carton and an article approach the loading station where the transfer is effected, devices of various types have been used to accomplish the transfer. In some machines the two conveyors are momentarily stopped at the loading station to permit the transfer to be made. Reciprocating pushers are generally used for this purpose. In other types of machines the conveyors are not stopped, and the pushers may be carried by chains or the like, which move through paths such that the pushers thereon are able to accomplish their purpose. In the machine shown and described in the copending application of A. H. Ross, Serial No. 731,395, filed February 27, 1947, for "Cartoning Machine," the loading conveyor has receptacles thereon, each receptacle having a reciprocable pusher or plunger thereon, which during the movement of the loading conveyor, engages a stationary cam track to cause it to slide in the receptacle and transfer the article to the carton on the adjacent transport.

In accordance with the instant invention no pushers or plungers are needed in the receptacles, although they may be retained, as will become apparent. The articles are transferred at the loading station by a simple rotating device which carries a series of pushers that move in a circular path while engaging the articles sequentially to transfer them to the cartons while both conveyors continue their movement at a constant uninterrupted rate. A planetary gear arrangement connected to the pushers assures that the same flat side of the pushers always act against the articles that are being transferred to the cartons.

It is accordingly a primary object of the invention to provide a new and improved apparatus for transferring articles from receptacles on one conveyor to those on another conveyor while the conveyors are moving in the same direction at the same rate of speed.

It is another important object of the invention to provide a novel device to eject an article of merchandise from a continuously moving loading conveyor into the open end of a carton moving continuously in a path parallel to the loading conveyor, the device comprising means rotating in a circular path in timed relation with the conveyor.

Another object is the provision of an improved cartoning machine including a carton conveyor, a loading conveyor, and power driven transfer means operable to transfer articles from the loading to the carton conveyor with a combined wiping and pushing action.

Other objects will appear as the description proceeds in connection with the accompanying drawings, wherein:

Figure 2 is a top plan view of a portion of the mechanism shown in Figure 1.

Figure 3 is a front elevation of the mechanism of Figure 2.

Figure 4 is a side elevation, partly in section, of Figure 2, as viewed from the right thereof.

Figure 5 is a bottom plan view of a portion of the mechanism, substantially as viewed along the line 5—5 of Figure 4.

Figure 6 is a vertical sectional view substantially along the line 6—6 of Figure 2.

Figure 7 is a vertical sectional view substantially along the line 7—7 of Figure 5.

Figure 8 is a vertical sectional view substantially along the line 8—8 of Figure 4.

Figure 9 is a vertical sectional view substantially along the line 9—9 of Figure 3.

Figure 10 is a partial sectional view substantially along the line 10—10 of Figure 3.

Figure 1:
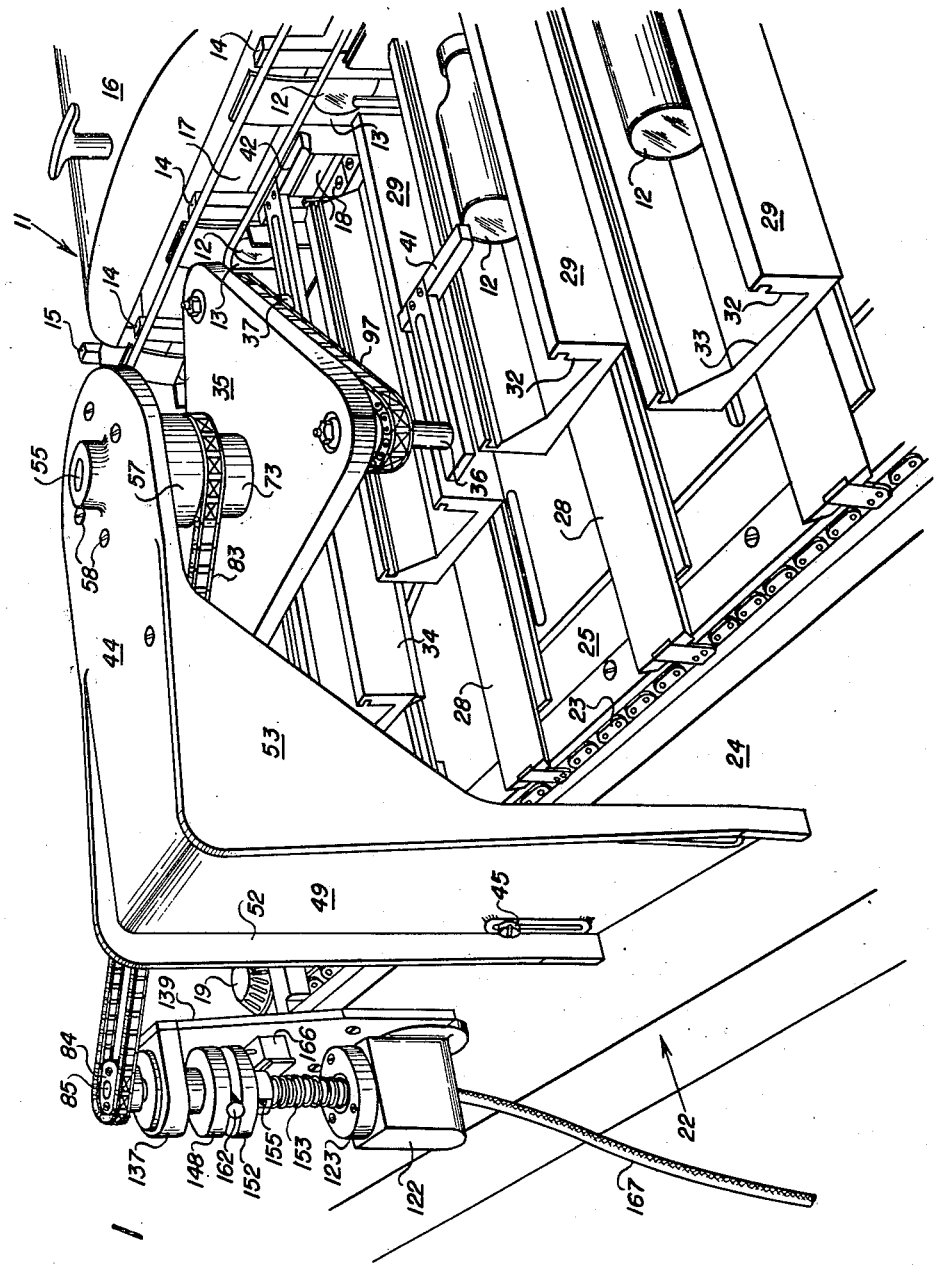
Figure 1 is a perspective view of an illustrative embodiment of the invention.

Referring to Figure 1 a transport or conveyor of the type disclosed in application Serial No. 731,395 filed February 27, 1947, by Alexander H. Ross for "Cartoning Machine" is indicated generally at 11. As far as the instant invention is concerned, the only function of the conveyor 11 is to carry equally spaced open ended cartons or the like at a uniform speed past the loading station where articles such as the bottles 12 are pushed into the open ends of the cartons 13 as they move from right to left in Figure 1. During their movement each of the cartons is pushed by a pair of transversely spaced trailing fingers 14 and 15. Only one trailing finger 15 is shown in Figure 1 because the others are obscured behind the overarm 16 which carries a hold-down bar 17 that confines the squared cartons against the table plates 18 of the transport. Each carton is confined against its pair of trailing fingers by a leading finger contacting its forward wall, these leading fingers not appearing in Figure 1 since they are beneath the hold down bar 17, substantially mid-point between each pair of trailing fingers 14 and 15, but forward thereof, so that each carton is confined between a leading finger and a pair of trailing fingers. The fingers are attached to endless chains beneath the table plates 18, the chains being driven at any selected speed by an electric motor that drives the whole machine, and which is controlled by adjustment of a speed control knob 19 (Figure 1).

Arranged alongside the transport or conveyor 11 is a loading conveyor designated generally in Figure 1 by the reference number 22. For illustrative purposes this is also shown to be of the type shown in the aforesaid application Serial No. 731,395. A pair of endless chains, only one of which is shown at 23 in Figure 1, are mounted on rotating shafts at the ends of a frame having a side wall 24. One of the shafts is shown at 26 (Figure 9) as well as the sprocket 27 thereon, which drives the chain 23, the sprocket 27 also serving to direct the chain around the end of the frame top wall 25 for its idle run thereunder. The two chains carry a series of dovetail slides 28 (Figure 1) arranged transversely of the chains and equally spaced therealong. Each slide carries an open topped trough shaped receptacle or bucket 29 which is open at the end facing the transport or conveyor 11. The spacing of the receptacles is such that each is directly abreast of a carton 13 on the conveyor 11, and the inside of the rear or trailing wall 32 of each receptacle is coplanar in a vertical plane with the inside of the trailing wall of a carton. The floors 33 of the receptacles 29 are sloped downwardly toward the trailing walls 32 so that articles of merchandise which are to be inserted into the cartons, such as the cylindrical bottles 12 will, under the force of gravity, rest against the trailing walls 32 and thereby lie in the correct position for insertion into the cartons.

The normal position of the receptacles 29 is such that their left ends are substantially directly over the left ends of the dovetail slides 28. However, as the loading conveyor 22 moves from right to left in Figure 1, at the same speed as the transport 11, stationary cam means, not shown, move the receptacles towards the transport 11 until they are closely adjacent the open ends of their respective cartons. In Figure 1 two of the receptacles are shown in this position, and since the bottles 12 are loaded into the cartons while the receptacles are in this relative position, it may be appropriately called a loading station. After the bottle has been loaded into a carton at the loading station another stationary cam, not shown, successively moves the receptacles back to their initial positions. In Figure 1 the receptacle identified by the reference number 34 has passed the loading station and has commenced its movement back to its initial position, which it reaches before the bucket passes around the sprockets on the shaft 26. It is to be understood that during this movement of the receptacles toward and away from the transport 11 they continue to travel from right to left, in Figure 1, at the same speed as the transport 11 and the cartons carried thereby.

Instead of the sliding plungers within the receptacles, and the stationary cam devices shown in the aforesaid application Serial No. 731,395 for ejecting the bottles from the receptacles and loading them into the cartons, the means now to be described are arranged to perform this function.

Referring to Figure 1, a triangular mounting plate 35 is supported by means to be described, for rotation about a vertical axis and in a horizontal plane above the tops of the receptacles 29 of the loading conveyor. Vertical cylindrical sleeves 36, 37 and 38 are mounted in each of the three apexes of the plate 35 for rotation about vertical axes, and pusher bars 41, 42 and 43 respectively, are attached to these sleeves adjacent their bottoms, to lie in the same horizontal plane just above the tops of the receptacles or buckets 29. As shown in Figures 1, 2 and 3 the pusher bars are of considerable length, and they are all in such position that their longitudinal dimension parallels the direction of movement of the transport 11 and the loading conveyor 22. They thus all have working faces that face toward the open ends of the cartons 13 on the transport.

As the triangular plate 35 is rotated at a speed correlated with that of the conveyors, a planetary drive system, which will be described, causes the pusher bars to be always parallel to the direction of movement of the conveyors. The lengths of the equal sides of the triangular mounting plate 35 are such, and its speed of rotation is such, that as it rotates, each of the pusher bars 41-43 will eject one of the bottles from its respective receptacle and push it into its carton. In order to do so, the articles, such as the bottles 12 must project above the side walls of the receptacles by a sufficient distance that they will lie in the paths of the pusher bars. When a pusher bar has inserted a bottle into its respective carton it is at the end of its stroke furthermost away from the axis of rotation of the mounting plate 35. The details of construction of the structure for supporting and operating the pusher bars 41-43 are as follows.

A right angled bracket having a horizontal leg 44 is secured to the side wall 24 of the loading conveyor frame by a pair of bolts 45 and 46 which pass through vertical slots 47 and 48 in the vertical leg 49 of the bracket, the slots permitting vertical adjustment of the bracket. The bracket is stiffened by side web members 52 and 53. Adjacent its free end the horizontal leg 44 has a cylindrical boss 54 (Figure 6), and a vertical shaft 55 has a press fit in a bore through the leg at that point, the shaft being fixed against rotation by a tapered pin 56 passing through the boss and the shaft. A cylindrical housing 57 is secured to the underside of the leg 44, and concentric to the shaft 55, by four screws 58 that pass through the bracket and are threaded into a flange 59 on the housing.

Within the central bore 62 of the housing are received the outer races of a pair of ball bearing assemblies 63 and 64, the inner races of which have a press fit on a cylindrical sleeve 65 that has an annular flange 66 to separate the bearing assemblies. The bearing assemblies and the sleeve 65 mounted therein are retained in the housing by a retainer ring 67 that is secured to the bottom of the housing as by screws 68, the ring engaging the outer race of the lower bearing assembly 64. The sleeve 65 being journalled for rotation by the bearing assemblies 63 and 64 there is a clearance between the sleeve and the shaft 55 except for the lower portion of the sleeve where a bearing bushing 69 in the sleeve journals the lower portion of the sleeve upon the shaft.

A spacing washer 72 on the sleeve 65 separates a planetary drive sprocket 73 from the lower bearing assembly 64, the sprocket 73 being rigidly secured to the top center of the triangular mounting plate 35 as by screws 74. A retainer ring 75 is secured to the bottom center of the triangular mounting plate 35 as by screws 76, and rests upon the upper race of a thrust bearing assembly 77. The lower race of the thrust bearing assembly 77 rests upon the hub of a planetary sun gear sprocket 78 which is secured to the bottom end portion of the shaft 55 by a through tapered pin 79. Thus the sun gear sprocket 78 supports the weight of the triangular mounting plate 35 and its associated parts including the sprocket 73, which are connected for rotation with the sleeve 65 by a key 82 between the sleeve 65 and the sprocket 73 with the triangular mounting plate 35 connected thereto. A sprocket chain 83 trained over the sprocket 73 drives the triangular mounting plate 35 at the desired speed, being driven by a sprocket 84 (Figure 1) on a vertical shaft 85 in a manner to be described.

The details by which the pusher bars 41–43 are mounted on the triangular mounting plate 35 are shown in Figure 6. At each of the three vertices of the mounting plate a bearing assembly 86 is mounted in a counter-bore in the under side of the mounting plate, the outer race of the bearing assembly being clamped between a shoulder 87 in the counter-bore and a retaining washer 88 secured to the mounting plate as by screws 89. The cylindrical sleeve 36 has a press fit at its upper end in the inner race of the bearing assembly, there being a shoulder 90 on the sleeve to locate it vertically. A bolt 91 passing through the bore of the sleeve and having a head 96 clamps the sleeve securely to the inner race, between the shoulder 90 and a nut 92, there being a washer 93 between the nut and the bearing inner race. The sleeve 36 is thus mounted for free rotation about its vertical axis, but a chain sprocket 94 is secured to the sleeve 36 by a set screw 95, and as will be described, a chain 97 passing around sprocket 94 and around the fixed sun gear sprocket 78, in the manner shown in Figure 5, assures that there will actually be no rotation of the sleeve 36 even though it is rotated about the fixed shaft 55 by the rotating triangular mounting plate 35.

As best shown in Figures 5 and 6, the pusher bar 41 is rigidly secured perpendicularly to a supporting bar 98 having a longitudinal slot 99. The bottom of the sleeve 36 has a pair of diametrically opposed flat surfaces 102 (Figure 6) over which the slot 99 fits, the supporting bar being securely clamped to the bottom of the sleeve 36 in any longitudinal position by the head 96 of the bolt 91. The other pusher bars 42 and 43 are secured to their sleeves 37 and 38 in the same manner.

Referring to Figures 5 and 7, a substantially U-shaped plate 103 is adjustably secured to the bottom of the triangular mounting plate 35 by a pair of cap screws 104 and 105 which pass through parallel slots 106 and 107 in the plate. At the ends of its legs the plate has a pair of shouldered screws 108 and 109 upon which are journalled for rotation a pair of idler sprockets 112 and 113. These idler sprockets lie in the same horizontal plane as the sun gear sprocket 78 and the sprockets 94, 114 and 115 on the sleeves 36, 37 and 38 respectively, the chain 97 being trained over these sprockets as shown in Figure 5. The sizes of the sprockets 78, 94, 114 and 115 are such that as the mounting plate 35 rotates about its axis the working faces of the pusher bars 41, 42 and 43 will always be parallel to the transport or conveyor 11 as shown in Figure 1. It will be apparent that these pusher bars will push the bottles 12 out of the receptacles or buckets 29 and into the cartons 13 by a combined pushing and wiping action against the bottoms of the bottles. In Figure 2 the pusher bar 41 is shown in dot-dash lines at 41a, in which position it will be when it has inserted the bottle 12 fully into the carton 13. With continued rotation of plate 35 the pusher bar moves away from the carton.

As described in the aforesaid application Serial No. 731,395, the transport or conveyor for the cartons is powered by an electric motor which also powers the drive shaft 26 (Figure 9) of the loading conveyor 22. At 19 in Figure 1 is shown the speed control knob for the electric motor. Figure 9 shows details of the mechanism for rotating the vertical shaft from which the triangular mounting plate 35 is driven in timed relationship with the movement of the loading conveyor.

The outboard end of the shaft 26 protrudes through the frame side wall 24 where it is journalled by a bearing 116, and the projecting end has a bevel gear 117 secured thereto by a tapered pin 118. A retainer 119 for the bearing 116 is recessed on its outer face to provide a seat securing alignment with the shaft 26 of a gear housing 122. A bearing housing ring 123 passes through a vertical bore in the housing 122 and is secured to the housing as by screws 124. A pair of ball bearing assemblies 125 and 126 are mounted in the bearing housing ring, the outer race of the lower bearing 126 resting upon an internal flange 127 in the ring 123 and the outer race of the upper bearing being engaged by a retainer ring 128 which is secured to the top of the housing ring 123. A vertical shaft 129 is journalled by the bearing assemblies 125 and 126, the shaft having an annular shoulder 132 which locates it axially and also separates the bearing inner races. Secured to the lower end of the shaft 129 by a screw 133 and a key 134 is a bevel gear 135 which meshes with the gear 117 on shaft 126.

The shaft 85, which carries the sprocket 84, is mounted in axial alignment above shaft 129 by a bearing assembly 136 suitably mounted in a horizontal plate 137 secured as by screws 138 to the upper end of a vertical plate 139 that is affixed to the frame side wall 24 by screws 142 (Figure 3).

At its upper end the shaft 85 carries a sprocket hub 143 which is secured by a tapered pin 144. The sprocket 84 is rotatably mounted upon the top of the hub 143, being located by a peripheral recess 145 on the hub. This permits angular adjustment of the sprocket upon the hub to permit timing of the rotary movement of the triangular mounting plate 35, as will be understood. A pair of screws 146 passing through slots 147 (Figure 2) in the sprocket 84 and threaded into the hub 143, are tightened to secure the sprocket in adjusted position.

At its lower end the shaft 85 has a clutch plate 148 secured to it by a tapered pin 149. As shown in Figure 9, the upper end of shaft 129 protrudes into the bore of the clutch plate 148, but the fit is such as to permit free relative rotation. A second, opposing clutch plate 152 is mounted with a sliding fit upon the shaft 129 and is resiliently urged upwardly by a compression spring 153. The lower or hub portion of the clutch plate 152 has a diametrical slot 154 therethrough, and the projecting ends of a pin 155, passing through the shaft 129, are received in the slot 154, whereupon rotation of shaft 129 is transmitted to the clutch plate 152 irrespective of the axial displacement of the clutch plate from its normal position. As best shown in Figures 10 and 3, the upper face of the clutch plate 152 has a pair of V notches 156 and 157 similarly disposed on opposite sides of its axis. The bottom face of the upper clutch plate 148 has an identical pair of notches 158 and 159 (Figure 3). Short cylindrical members 162 and 163 are mounted in the recesses 156 and 157 in the lower clutch plate, being fixed therein by screws 164 and 165 (Figure 10) respectively. In normal operating position the tops of the cylindrical members are seated in the notches 158 and 159 in the upper clutch plate, being resiliently urged thereinto by the force of the spring 153. The construction provides an overload clutch assembly which permits disengagement of the drive to the triangular mounting plate 35 if a jam should occur in the loading of the bottles into the cartons, and also provides for simultaneously cutting off the power supply to motor drive for the entire machine, in the following manner.

A cut off switch 166 (Figures 1 and 9) is mounted on the vertical plate 139 below the lower clutch plate 152, the switch being connected in the power supply conduit 167 leading to the drive motor. Protruding upward from the top of the switch housing is a vertically movable plunger 168 that is spring held in its upward position by mechanism within the switch, and the circuit to the motor is closed when the plunger is in its upward position. The plunger is disposed beneath the lower clutch plate 152. If a jam should occur the clutch plate 152 will be cammed downwardly by the action of the cylindrical members 162 and 163 in the V notches in the upper clutch plate. As the lower clutch plate moves downwardly it strikes the plunger 168, depressing it and thus cutting off the power supply to the entire machine.

In order to eliminate slack in the return run of the chain 83 an idler sprocket 169 (Figure 2) engages the chain. The idler sprocket is carried on a bracket 170 adjustably secured to the underside of angle bracket leg 44 by screws 171 passing through a slot 172 in the bracket 170.

The construction thus provides a simplified apparatus for ejecting the articles from the loading conveyor receptacles and pushing them into the cartons. The reciprocating plungers, which had to protrude from the receptacles when pushing the articles fully into the cartons, are eliminated, thus greatly reducing the cost of each receptacle assembly. With the instant construction the pusher bars can project any desired amount beyond the open ends of the receptacles, since they are adjustably secured upon their supporting sleeves. While the illustrated embodiment shows three such pusher bars 41 etc. it will be apparent that the number will depend upon several variables, such as the size and spacing between the open cartons on the transport. The action of the pusher bars is smooth and continuous, and there are no reciprocating elements. Due to the planetary drive, the faces of the pusher bars always act in the direction in which the articles are to be moved, yet the supporting and driving arrangement for the pusher bars is simple and inexpensive. Although the illustrated machine shows articles being transferred from receptacles into longitudinally aligned cartons, it will be understood that articles can also be transferred from one endless belt to another since the working faces of the rotating pusher bars are always parallel to the direction of movement of the conveyors, and hence will push articles directly perpendicular to the direction of conveyor movement.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all charges which come within the meaning and range of equivalency of the claims are therefore intended to be embraced therein.

What is claimed and desired to be secured by United States Letters Patent is:

1. In a cartoning machine, a first conveyor operable to convey a series of cartons along a fixed path; a second conveyor having a portion operable to follow a second path parallel to said fixed path, said second conveyor having a series of receptacles spaced therealong and mounted for transverse reciprocation thereon for juxtaposition alongside the cartons caried by said first conveyor, means for reciprocating said receptacles from a normal position on said second conveyor spaced from said first conveyor to a position in substantial juxtaposition with said cartons; a pusher element supporting means mounted adjacent said second conveyor for rotation in a plane parallel to said second conveyor; at least one pusher element attached to said supporting means and extending toward said receptacles for engagement with articles carried by said receptacles, said pusher element being operable in one revolution of said supporting means to transfer an article from a receptacle to a carton on said first conveyor; and driving means operable to rotate said supporting means and drive said conveyors in timed relationship.

2. In a cartoning machine, a first conveyor operable to convey a series of cartons along a fixed path, means for feeding a series of articles to a position adjacent said conveyor, means for transfering said articles from said feeding means to said cartons, means for driving said transfer means and said first conveyor in timed relationship, a source of power connected to said driving means, an over-load device normally coupling said transfer means with said driving means but operable to decouple said transfer means and said driving means in the event of an excess load being placed on said transfer means.

3. In a machine set forth in claim 2, means actuated by decoupling of said overload device to render said power source inoperative.

JOHN F. CURRIVAN.

REFERENCES CITED

The following references are of record in the file of this patent:

UNITED STATES PATENTS

| Number | Name | Date |
|---|---|---|
| 262,478 | Richardson | Aug. 8, 1882 |
| 604,417 | Richardson | May 24, 1898 |
| 1,341,487 | Warme et al. | May 25, 1920 |
| 2,133,248 | Jones | Oct. 11, 1938 |
| 2,432,823 | Sedwick | Dec. 16, 1947 |
| 2,440,866 | Malhiot | May 4, 1948 |
| 2,517,616 | Weygant et al. | Aug. 8, 1950 |